Dec. 10, 1968   A. M. BOLDT   3,415,523
GOLFER'S TRAINING DEVICE
Filed Aug. 17, 1966   4 Sheets-Sheet 3

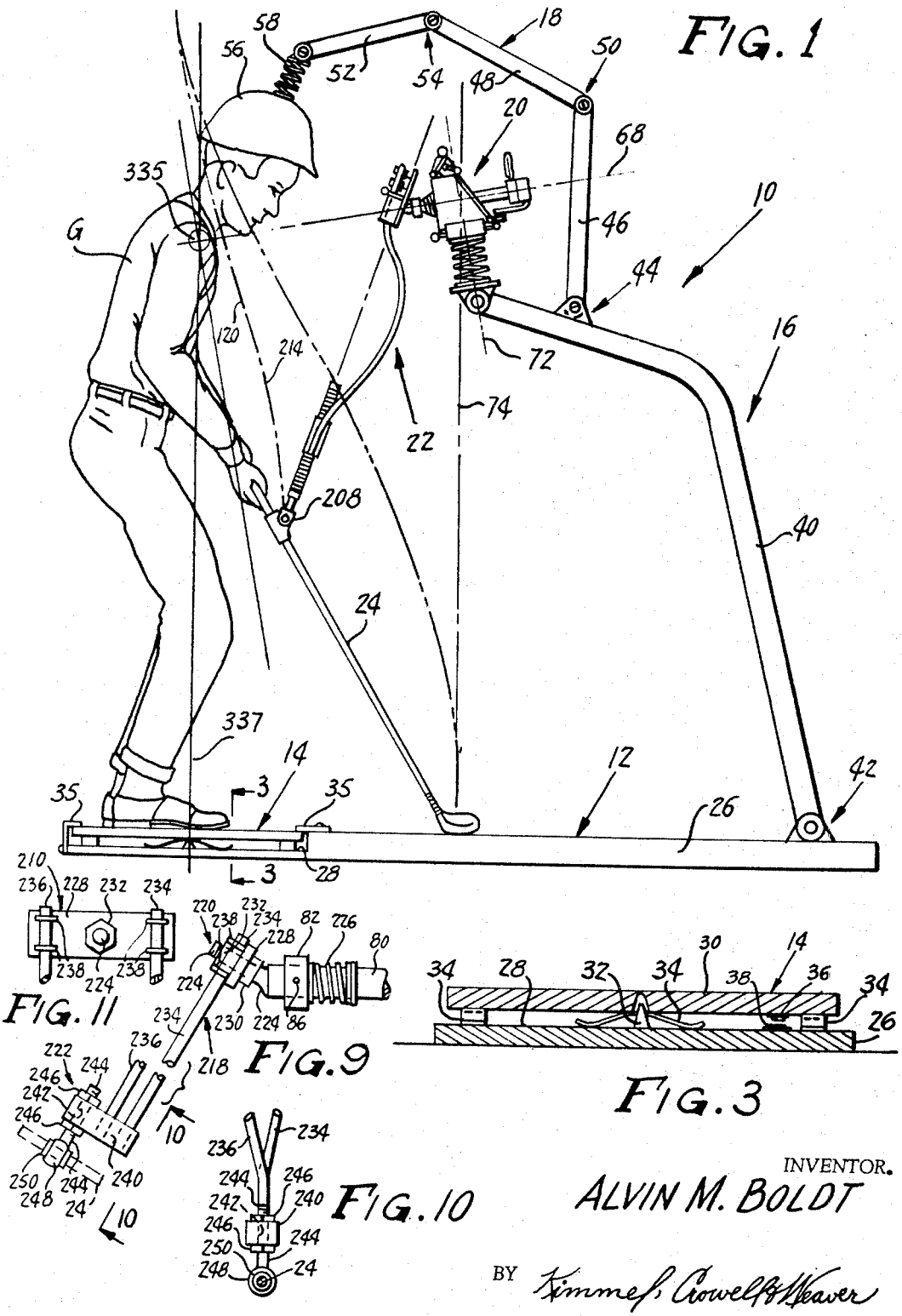

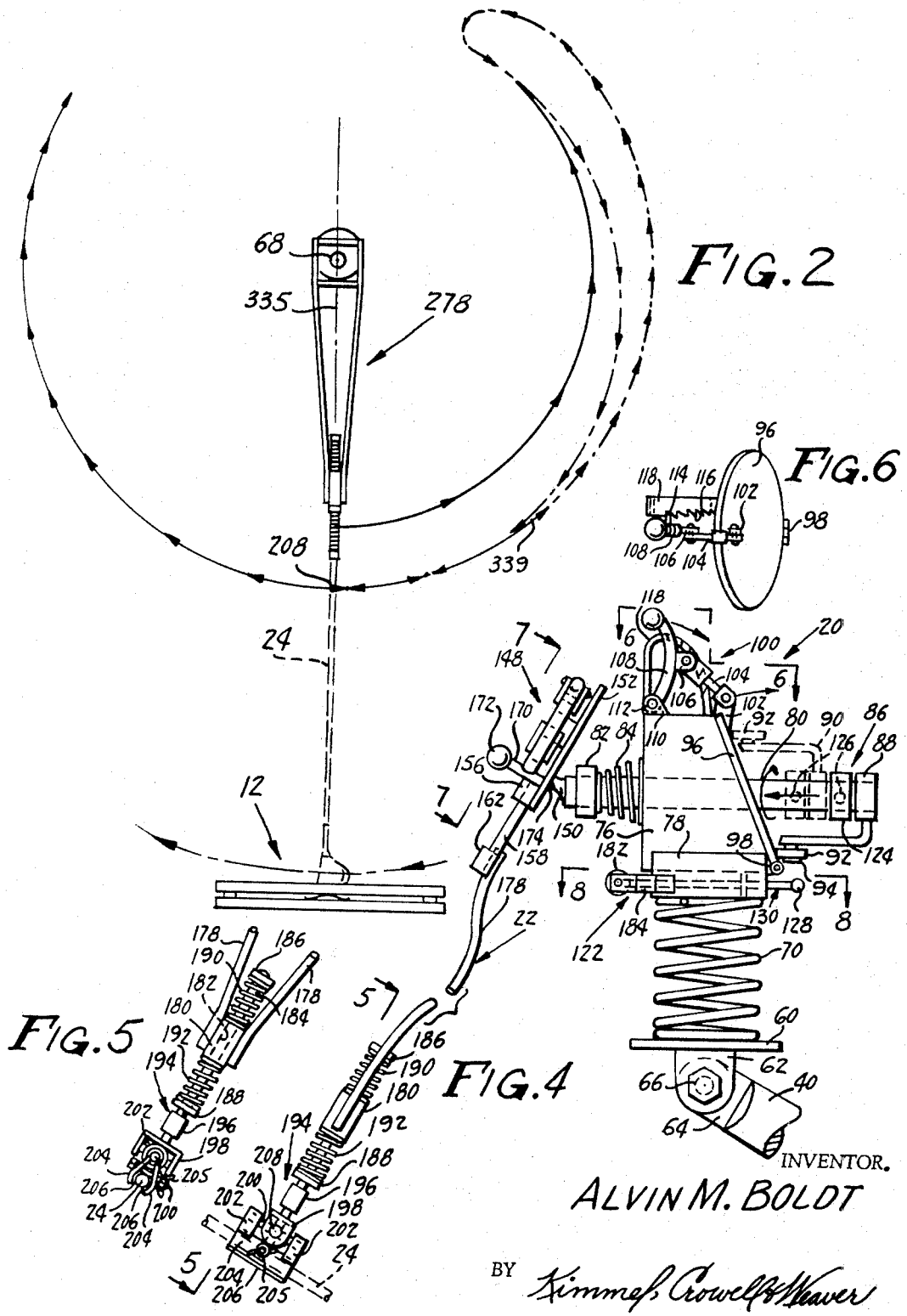

INVENTOR.
ALVIN M. BOLDT
BY Kimmel, Crowell & Weaver
ATTORNEYS.

Dec. 10, 1968    A. M. BOLDT    3,415,523
GOLFER'S TRAINING DEVICE
Filed Aug. 17, 1966    4 Sheets-Sheet 4
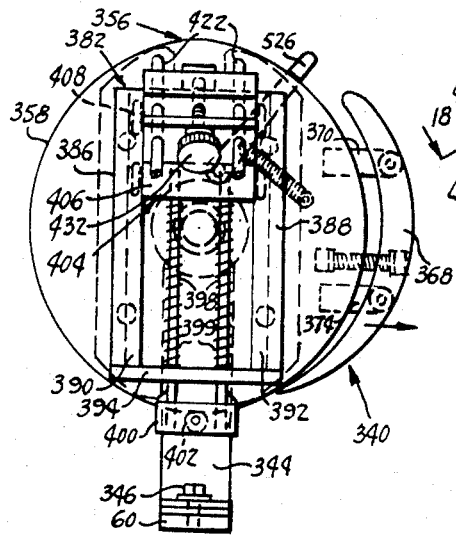
FIG.17
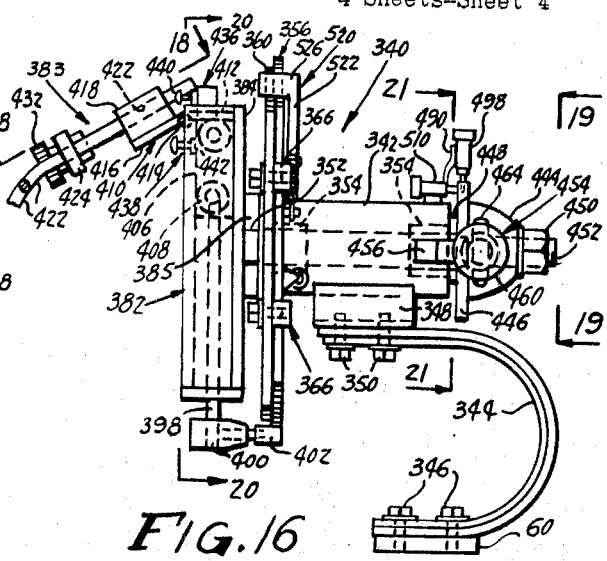
FIG.16
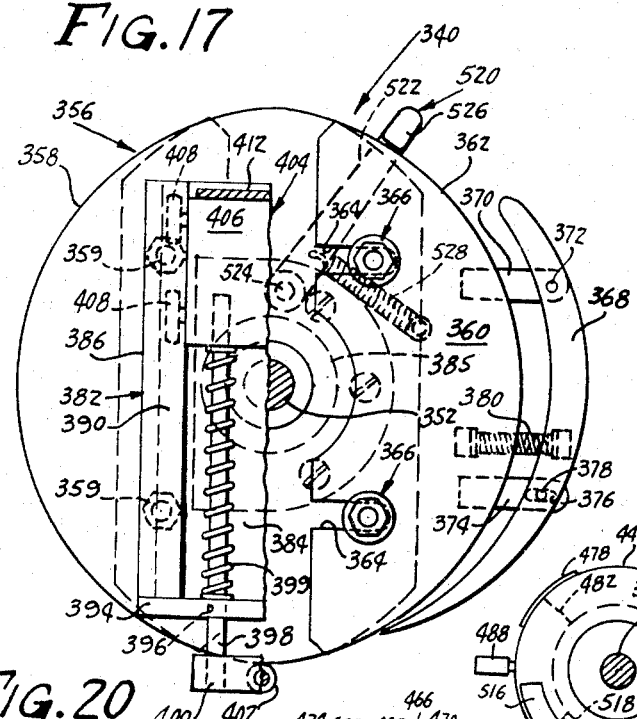
FIG.20
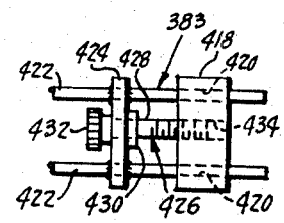
FIG.18
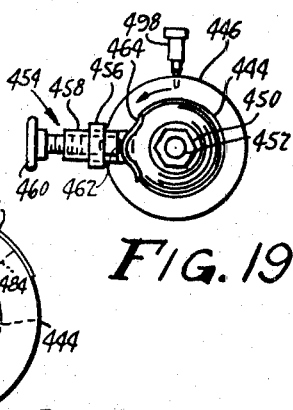
FIG.19
FIG.21
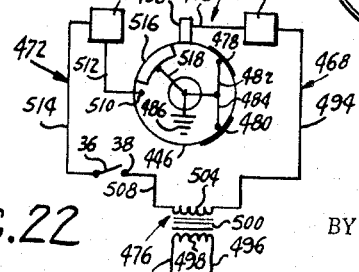
FIG.22
INVENTOR.
ALVIN M. BOLDT
BY Kimmel, Crowell & Weaver
ATTORNEYS.

3,415,523
GOLFER'S TRAINING DEVICE
Alvin M. Boldt, 1147 High St.,
Eugene, Oreg. 97401
Filed Aug. 17, 1966, Ser. No. 573,054
10 Claims. (Cl. 273—186)

This invention relates to golf training devices of the type in which a neophyte golfer swings a golf club that is guided through a predetermined arc in order to demonstrate the correct swing.

A study of excellent golfers has indicated that, with the except of a few individuals having obvious physical abnormalities, such as being greatly overweight, greatly underweight or having deformed limbs, the golf swing of these individuals is substantially the same. This is not to say that all excellent golfers have identical swings since it is well known that taller individuals tend to have a more upright swing whereas shorter individuals tend to have what is termed a "flatter swing," these terms indicating the angular relationship between the locus of clubhead movement and the ground. In addition to these variances, all golfers tend to have minor variations in swing, for example, some golfers tend to swing more from the inside out than do other golfers and some golfers have a fuller backswing than others.

The golf training devices of the prior art seem to be categorized into two groups, the first constraining clubhead movement to a substantially circular path in which the distance from the golf club to the training apparatus may be varied at the will of the student while the second group constrains the golf club in an unalterable path in which the training device controllably varies the distance from the club to the training device. It has been found that this first group of prior art devices allows undesirable movement of the club toward the training device by the neophyte golfer, while the second group of prior art devices does not take into account any difference in inside out movements of the clubhead during the downward travel thereof. It has been found that by resiliently mounting the swing guide mechanism, which controls the movement of the golf club toward and away from a support, the disadvantages of both groups of prior art devices may be obviated while combining the most advantageous features of each.

It is accordingly an object of the instant invention to provide a golf training device in which a golf club is substantially constrained for movement in a predetermined arcuate non-circular path while allowing the student to make slight variations in accordance with his own personal idiosyncrasies.

Still another object of the instant invention is to provide a golfer's training device in which a swing guide mechanism is resiliently mounted on a support and operatively connected to a golf club for allowing a student golfer to swing the golf club in accordance with the configuration of the swing guide mechanism and at the same time allow for slight variations in the student's swing.

A further object of the instant invention is to provide a golf swing training device in which a resistance force is imparted there-against during the downswing to demonstrate to the student that the arms and wrists exert a certain amount of force during this portion of the swing in order to acquire sufficient distance from the individual's woods and long irons.

Still another object of the instant invention is to provide a golfer's training device in which the characteristic loop at the top of the backswing is automatically achieved by the arrangement of the controlling mechanisms of the instant invention.

Other objects and advantages of the instant invention reside in the combinations of elements, arrangements of parts, and features of construction and operation, all as will be morefully pointed out hereinafter and disclosed in the accompanying drawings wherein there is shown a preferred embodiment of this inventive concept.

In the drawings:

FIGURE 1 is a side elevational view of one form of golfer's training device of the instant invention illustrating a student golfer about to swing a golf club;

FIGURE 2 is a schematic view illustrating separately the path of travel of the point of contact between the training device of the instant invention and the golf club, which describes a closed loop, and the travel of the individual's hands during the backswing;

FIGURE 3 is an enlarged transverse cross-sectional view of the student supporting platform of FIGURE 1 taken substantially along line 3—3 thereof as viewed in the direction indicated by the arrows;

FIGURE 4 is an enlarged side elevational view of the swing guide mechanism and golf club holder made in accordance with the principles of the instant invention;

FIGURE 5 is a front elevational view of the golf club holder of FIGURE 4 as seen from along line 5—5 viewed in the direction indicated by the arrows;

FIGURE 6 is a partial top plan view of the swing guide mechanism of FIGURE 4 illustrating the adjusting means by which variations in clubhead travel from the inside out may be changed to meet the individual needs of the golfing student;

FIGURE 9 is a side elevational view of another embodiment of the mounting mechanism and golf club holder which may be used with the swing guide mechanism of FIGURE 4;

FIGURE 10 is an enlarged view of the golf club holder of FIGURE 9 as may be seen from along line 10—10 thereof as viewed in the direction indicated by the arrows;

FIGURE 11 is an enlarged view of the mounting mechanism of FIGURE 9;

FIGURE 16 is a side elevational view of another form of swing guide mechanism made in accordance with the principles of the instant invention;

FIGURE 17 is a front elevational view of the swing guide mechanism of FIGURE 16;

FIGURE 18 is a top plan view of the mounting bracket of the swing guide mechanism of FIGURE 16 as may be seen from along line 18—18 thereof as viewed in the direction indicated by the arrows;

FIGURE 19 is a rear elevational view of the uppermost portion of the swing guide mechanism of FIGURE 16 as may be seen from along line 19—19 thereof as viewed in the direction indicated by the arrows;

FIGURE 20 is an enlarged cross-sectional view of the swing guide mechanism of FIGURE 16 taken substantially along line 20—20 thereof as viewed in the direction indicated by the arrows, certain portions being broken away for clarity of illustration;

FIGURE 21 is a schematic cross-sectional view of the rear portion of the swing guide mechanism of FIGURE 16 as may be seen from along line 21—21 thereof as viewed in the direction indicated by the arrows; and FIGURE 22 is a schematic electrical circuit utilized with the embodiment of FIGURES 16 to 21 inclusive.

General construction and operation

Figure 7:
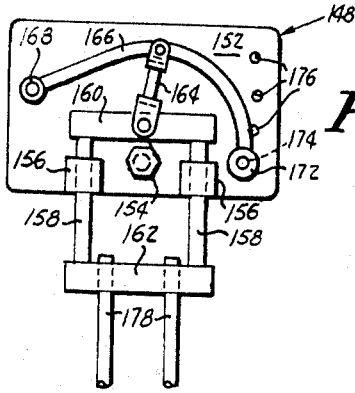
FIGURE 7 is an enlarged elevational view of the upper portion of the mounting bracket of FIGURE 4 taken substantially along line 7—7 thereof as viewed in the direction indicated by the arrows.

Referring now to the drawings in detail, wherein like reference characters designate like elements throughout the several views thereof, there is indicated generally at 10 a golfer's training device made in accordance with the principles of the instant invention having as its major components a base shown generally at 12 on which is positioned a fulcrumed platform denominated generally at 14 on which a golfer G is standing, a support shown generally at 16 on which is mounted a head constraining device designated generally at 18, a swing guide mechanism illustrated generally at 20 resiliently mounted on support 16 and a golf club holder shown generally at 22 connecting guide mechanism 20 with a golf club 24. When the golfer starts to swing, guide mechanism 20 will restrain the path of movement of golf club 24 in a predetermined manner with platform 14 acting to remind the golfer to shift his weight to the right leg during the backswing and to the left leg during the downswing. Head constraining device 18 allows the golfer's head to rotate slightly and at the same time preclude substantial upward movement thereof.

Base, support and head constraining mechanism

Base 12 includes a substantially planar foundation 26 recessed at 28 to receive platform 14 which includes a substantially planar plate 30 supported on a fulcrum 32 in recess 28. The periphery of plate 30 is resiliently supported by a plurality of U-shaped springs 34 while retention brackets 35 prevent plate 30 from excessive upward movement. A pair of electrical contacts 36, 38 are placed on opposite sides of fulcrum 32 in aligned relation such that if the individual's weight is not shifted properly during the backswing and downswing, an electrical circuit will be energized to sound a buzzer reminding the student that his weight has not shifted properly, as will be explained more fully hereinafter.

Support 16 includes a generally upstanding arm 40 adjustably secured to foundation 26 by a conventional pivotal adjustment shown generally at 42 for adjusting and locking the angular relationship of arm 40 to foundation 26. The upper end of arm 40 is angled toward the golfer's position and carries another conventional pivotal adjusting means shown generally at 44 adjustably securing head constraining device 18 to support 16.

Constraining device 18 includes a first segment 46 secured by adjusting means 44 in an appropriate relation with respect to support 16, a second segment 48 connected with first segment 46 by a suitable adjustment locking device shown generally at 50 and a third segment 52 adjustably connected by a conventional adjustable locking means shown generally at 54 in a downwardly angled direction with respect to second segment 48. A relatively rigid cap 56 is received on the head of the golfer and is connected to the free end of third segment 52 by a relatively stiff spring 58 which allows rotary movement of the individual's head but precludes substantial upward movement thereof.

Referring now to the FIGURE 4, a mounting plate 60 is adjustably secured to the free end of support arm 40 by an integral depending ear 62 cooperating with an ear 64 formed on the end of support arm 40 with a suitable releasable fastener 66, such as a nut and bolt, effecting an adjustable connection between mounting plate 60 and support arm 40. As will be more fully explained hereinafter, golf club 24 will be moved in an arcuate path about an axis 68 (FIGURE 1) extending through swing guide mechanism 20. Depending upon the height of the neophyte golfer, axis 68 will be adjusted such that an imaginary extension thereof intersects the golfer at about the base of the neck. Because of the adjustable nature of mounting plate 60 with respect to arm 40, it will be apparent that this adjustment may be readily made.

Swing guide mechanism of FIGURES 4 to 8

Resiliently supporting swing guide mechanism 20 is a helical spring 70 having its axis 72 inclined slightly with respect to a vertical plane 4 which illustrates the flight path of the golf ball. It will be apparent that swing guide mechanism 20 may oscillate slightly about axis 72 to allow for minor variations in the swing of the individual. Swing guide mechanism 20 includes a housing 76 having a pair of spaced apart depending plates 78 secured in any conventional manner to the upper end of helical spring 70 completing the securement of guide mechanism 20 to support 16. A slidable and rotatable shaft 80 carries a boss 82 adjacent the forward end thereof with a spiral spring 84 abutting boss 82 and housing 76 to bias shaft 80 toward the golfer's position with a camming mechanism shown generally at 86 being positioned on the rear end of shaft 80 for controlling the movement of the golfer's hand toward and away from vertical plane 74. Camming mechanism 86 includes a rearwardly disposed boss 88 providing securement between shaft 80 and an L-shaped arm 90 carrying a roller 92 for rotation about a stub axle 94.

Roller 92 engages a camming plate 96 pivotally mounted on housing 76 by a hinge 98. Camming plate 96 is angularly mounted about hinge 98 by an adjusting means shown generally at 100. Adjusting means 100 includes an ear 102 affixed to the upper end of plate 96 pivotally connected to a rod 104 which is in turn pivotally connected to an ear 106 on a pivotal handle 108. Handle 108 is pivotally mounted by an ear 110 and a pivot pin 112 on the upper surface of housing 76. As shown best in FIGURE 6, a transversely extendinfg pin 114 registers with one of a plurality of angle slots 116 formed in an arcuate bar 118 secured to housing 76. It will be seen that the pivotal movement of handle 108 will position pin 114 in a selected slot 116, thereby establishing the angle of camming surface 96 with respect to shaft 80. It will be apparent that the backswing of golf club 24 will rotate shaft 80 in the direction shown by the arrow in FIGURE 4 with roller 92 engaging cam plate 96 under the influence of spring 84 to reciprocate shaft 80 toward the golfer to produce a locus 120 of desired shape described by a trace of the connection between golf club holder 22 and golf club 24 during the backswing.

Cooperating with camming mechanism 86 is a braking mechanism shown generally at 122 compelling the golfer to exert increased forces through the wrists and arms during the downswing to correspond to the forces generated during the power segment of tse swing. Braking mechanism 122 includes a boss 124 fixed on shaft 80 carrying a radially extending braking lever 126 which comes into contact with a knob 128 on the rearward end of a pivotally mounted arm shown geenrally at 130. As may be seen best in FIGURE 8, arm 130 includes a first segment 131 pivotally mounted on a plate 132 by a pivot pin 134. Arm 130 is biased to the central position illustrated by a pair of springs 136 that are connected to depending plates 78 by a pair of angled brackets 138 and a pair of connectors shown generally at 140. Arm 130 also includes a second segment 142 hingedly mounted on a first segment 131 by a one-way hinge 144 allowing pivotal movement of second segment 142 in the direction indicated by the arrow. A spring 146 connects second segment 142 to depending wall 78 to maintain first and second segments 131, 142 in a normally aligned relation.

In describing the operation of braking mechanism 122, it should be pointed out that braking lever 126 lags golf club holder 22 on the backswing and leads club holder 22 on the downswing. As shown in FIGURE 4, braking lever 126 extends to the left when club holder 22 is in the ball-addressing position shown. As the student swings club holder 22 through the backswing, braking lever 126 will contact knob 128 of arm 130 about halfway through the backswing. As further backswing is created, lever 126 pivots second segment 142 in a direction shown by the arrow in FIGURE 8 against the biasing forces of spring 146.

Figure 8:
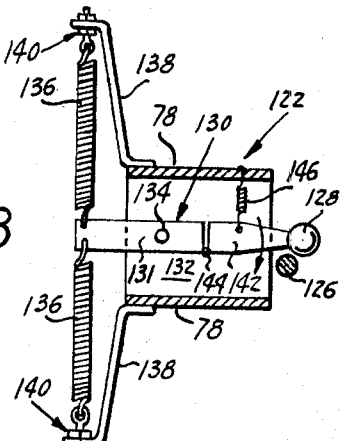
FIGURE 8 is a horizontal cross-sectional view of the swing guide mechanism of FIGURE 4 taken substantially along line 8—8 thereof as viewed in the direction indicated by the arrows and illustrating the mechanism which requires the student to exercise the wrists and arms on the downswing.

Slightly before the backswing is completed, braking lever 126 will clear knob 128 allowing second segment 142 to be pivoted by the forces of spring 146 into the aligned position shown in FIGURE 8. During the first part of the downswing, braking lever 126 is free to move without engagement with arm 130. At a point slightly before half of the downswing is completed, braking lever 126 contacts arm 130 as shown in FIGURE 8 with additional force being needed to rotate arm 130 against the forces of springs 136. This corresponds to the power segment of the golf swing and requires the student to exert maximum amount of force on the golf club corresopnding to the point of time in the swing that maximum exertion is needed. Shortly after golf club 24 passes the ball-addressing position, braking lever 126 is freed from contact arm 130 because of the slidable movement of shaft 80 to which lever 126 is secured. Accordingly, the student no longer has to swing golf club 24 against the forces of springs 136 thus allowing free club movement.

Referring now to FIGURES 4 and 7, golf club holder 22 is connected to an upwardly extending threaded shank 150 of shaft 80 by a mount shown generally at 148. A mounting plate 152 is received on shank 150 with a nut 154 making the engagement secure. As seen best in FIGURE 7, a pair of horizontally spaced apart guides 156 are secured to plate 152 and slidingly receive a pair of short rods 158 which are fixed in parallel relation by a pair of cross-beams 160, 162. Upper crossbeam 160 is pivotally connected by an arm 164 to an arcuate brace 166, one end of which is pivotally mounted on plate 152 by a pin 168. The other end of arcuate brace 166 carries a selector bar 170 having an enlarged knob 172 on the outer end thereof (FIGURE 4) and a pin 174 of a size to be received in one of apertures 176. Since apertures 176 are spaced on an arc about pivot pin 168, it will be seen that pin 174 may be received in any one of them to move crossbeam 160 toward and away from the upper edge of mounting plate 152 for varying the angle of golf club 24 with respect to the horizontal to accommodate players of different physical characteristics.

Crossbeam 162 carries a pair of curved rods 178 which converge toward golf club 24 and are fixedly secured to a sleeve 180 as shown in FIGURES 1 and 4. As seen best in FIGURES 4 and 5, sleeve 180 forms a central passageway 182 slidably receiving a rod 184 having a boss 186, 188 at each end thereof. A pair of helical springs 190, 192 centrally space rod 184 in sleeve 180 and allow a slight amount of movement of golf club 24 independent of elongate rods 178 so that training device 10 may be utilized with individuals of varying physical characteristics.

A golf club grasping means shown generally at 194 includes an extension 196 of rod 184 which extends through an inverted U-shaped retaining bracket 198 for attachment with a transverse pin 200. Pin 200 is parallel with the shaft of golf club 24 and pivotally receives a sleeve 202 on each end thereof secured together by a pair of inwardly biased arms 204 carrying resilient inserts 206 for grasping golf club 24. A plurality of adjusting thumbscrews 205 interconnect arms 204 for selectively tightening the securement between holder 22 and golf club 24. It will be apparent that sleeves 202 may rotate about pin 200 but are constrained to limited movement by the depending arms of restraining bracket 198. Accordingly, a slight degree of club rotation is allowed to further enhance the flexibility of the training device of the instant invention.

For purposes of further illustration, a point 208 on grasping means 194 and the head of club 24 will be utilized to show the golf swing pattern produced by guide mechanism 20. During the swing of golf club 24, club 24 and shaft 80 are rotated together with roller 92 cooperating with cam surface 96 for controllably varying the distance between club holder 148 and housing 76. At a point in the backswing, designated at 214, in FIGURE 1, roller 92 will begin substantial upward movement along surface 96 allowing spiral spring 84 to move shaft 80 forwardly. Accordingly, locus of point 208, designated at 120, departs from a planar path at point 214 thereby controllably creating a golf swing more nearly approaching that of an excellent golfer.

*Golf club holder of FIGURES 9 to 11*

Referring now to FIGURES 9 to 11, another form of golf club holder is shown generally at 218 comprised of a mount shown generally at 220 and a club grasping means shown generally at 222. Mount 220 is connected to slidable and rotatable shaft 80 by an upturned threaded shank 224 with a helical spring 226, instead of spiral spring 84 illustrated in FIGURE 4, acting to bias mount 220 forwardly during the backswing. Mount 220 includes a plate 228 received on shank 224 between a pair of lock nuts 230, 232. A pair of elongate rods 234, 236 are affixed to plate 228 by a plurality of U-shaped fasteners 238.

Rods 234, 236 are preferably bowed away from the individual intermediate the ends thereof such that when golf club 24 is swung to the top of the backswing, rods 234, 236 will readily clear the individual's head. As seen most clearly by comparing FIGURES 9 to 11, it will be seen that rods 234, 236 are curved such that they start out in a substantially horizontally aligned relation as shown in FIGURES 9 and 11 and terminate in a connecting block 240 in a substantially vertical relation. Connecting block 240 includes an aperture 242 receiving a threaded shank 244 secured therein by a pair of nuts 246 with shank 244 carrying a golf club receiving connection 248 on the end thereof provided with a central resilient insert 250 for grasping golf club 24. It will be seen that golf club 24 is allowed some rotary movement about its axis to impart the feeling of reality to training device 10. Since the operation of golf club holder 218 is substantially the same as the operation of club holder 22, except that mount 220 does not provide for the reciprocable adjustment of the rods as does mount 148 for rods 178, further explanation is deemed unnecessary.

Swing guide mechanism of FIGURES 12 to 15

Referring now to FIGURES 12 to 15 inclusive, there is indicated generally at 278 another form of swing guide mechanism secured to support arm 40 through helical spring 70 and mounting plate 60 as in the embodiment of FIGURES 4 to 8 inclusive. Guide mechanism 278 includes a cylindrical casing 280 closed at one end by a plate 282 affixed to the top of helical spring 70 by an L-shaped brace 284. As may be seen best in FIGURE 13, a shaft 286 is rotatably mounted by a bearing shown generally at 288 such that the forward end of shaft 286 extends through three concentric apertures 292, 294, 296 of increasing size. Bearing 288 includes a circumferential support 298 affixed to the upstanding leg of brace 284 and a sleeve 300 secured to shaft 286 and spaced from support 298 by a plurality of ballbearings 302.

Affixed to the forward end of shaft 286 is a sleeve 304 slidably receiving a rod 306 which interconnects the ends of a U-shaped bracket 308. Sleeve 304 is centrally spaced with respect to bracket 308 by a compression spring 310 surrounding rod 306 and abutting one leg of bracket 308. The bight of bracket 308 carries an ear 312 on which is pivotally mounted an arm 314 carrying on outwardly extending roller 316 engaging a slot 318 in casing 280 with slot 318 describing the major portion of an ellipse.

Figure 12:
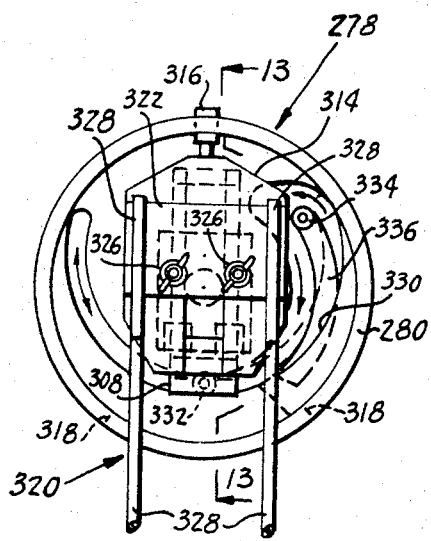
FIGURE 12 is a front elevational view of another form of swing guide mechanism made in accordance with the principles of the instant invention.
Figure 13:
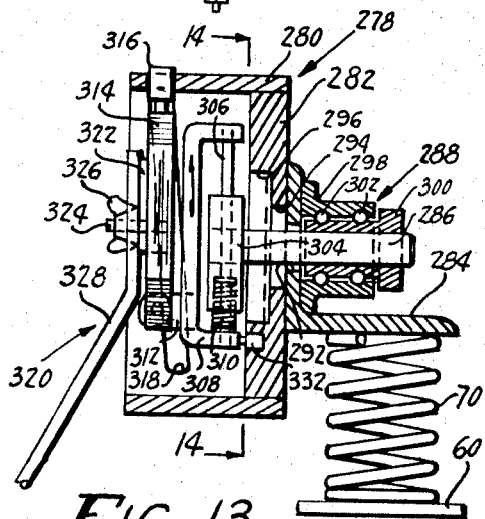
FIGURE 13 is a longitudinal vertical cross-sectional view of the swing guide mechanism of FIGURE 12 taken substantially along line 13—13 thereof as viewed in the direction indicated by the arrows.

As may be seen in FIGURES 12 and 13, a club holder shown generally at 320 is affixed to arm 314 by a plate 322 which is secured therebetween by a pair of threaded bolts 324 and wing nuts 326. A pair of elongate rods 328 are secured to plate 322 in any conventional manner and extend backwardly toward the golfer's position carrying a golf club grasping mechanism (not shown) of the type previously shown. Since slot 318 is elliptical in nature, it will be seen that the movement of roller 316 therethrough will act to space club holder 320 toward and away from casing 280 in much the same manner that the cooperating cams and rollers of the previous embodiment acted to space the club holder from the swing guide mechanism. It is apparent that the movement of club holder 320 with respect to casing 280 is in the nature of a pivotal motion rather than a single simple longitudinal movement as shown in the previous embodiment.

This has proved to be quite advantageous since it allows the shortening of the radius of curvature on the downswing to create the hairpin loop shown in FIGURE 2. To create this effect, an arcuate guide slot shown generally at 330 is formed in plate 282 and receives a roller 332 rotatably mounted on one of the arms of U-shaped bracket 308. As the golfer makes the backswing, roller 332 moves in the direction of the arrow shown in FIGURE 14 effecting an elongation of the radius of rotation by moving U-shaped bracket 308 and arm 314 in a lateral direction. When roller 332 passes over the apex 333 of slot 330, it passes over a pivotal mounting shown generally at 334 on which is affixed a diverting cam 336. When the downswing starts, roller 332 passes on the other side of pivotal connection 334 and moves diverting cam 336 outwardly such that U-shaped bracket 308 is moved toward shaft 286 thereby creating the closed loop at the top of the backswing shown in FIGURE 2.

Figure 14:
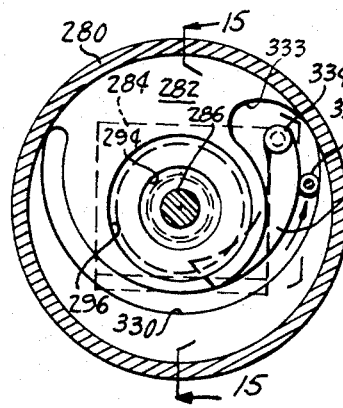
FIGURE 14 is a transverse cross-sectional view of the swing guide mechanism of FIGURE 13 taken substantially along line 14—14 thereof as viewed in the direction indicated by the arrows illustrating the means by which the hairpin loop at the top of the backswing is achieved.
Figure 15:
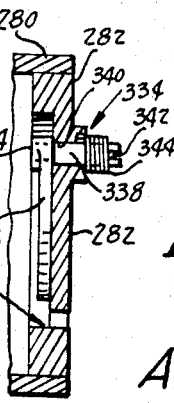
FIGURE 15 is a partial cross-sectional view of the swing guide mechanism of FIGURE 14 taken substantially along line 15—15 as viewed in the direction indicated by the arrows.

When roller 332 clears diverting cam 336, cam 336 will be biased into the position shown in FIGURE 14 with roller 332 continuing its movement through guide slot 330. Because of the energy necessary to bias diverting cam 336 out of the path of roller 332 during the backswing, it will be seen that cam 336 acts much like braking means 122 of the previous embodiment to increase the force exerted by the student during the downswing.

Pivotal connection 334 includes a shaft 338 rotatably received in a passageway 340 in closure wall 282 with the forward end of shaft 338 being secured to cam 336. The rearward end of shaft 338 forms a slot 342 in which is positioned one end of a spring 344, the other end of which is affixed to the rear of wall 282. It will be apparent that spring 344 acts to bias cam 336 toward the position shown in FIGURE 14 and also accomplishes the function of braking the downward swing to increase the exertion supplied by the golfer.

When utilizing swing guide mechanism 278 on training device 10, it will be apparent that the start of the backswing will cause roller 316 to position club holder 320 angularly away from support 16 while guide slot 330 and roller 332 cooperate to vary the radius of rotation. Both of these displacements increase in magnitude until the top of the backswing is reached, at which time roller 332 passes over pivotal connection 334 to decrease the radius of rotation preparatory to downswing movement.

For purposes of further illustration, point 208 at the junction of golf club 24 and club holder 22 will be utilized to show the change of arc produced by the movement of club 24 about a point 335 which is the intersection of axis 68 with a vertical plane 337 drawn through the feet of the neophyte golfer as shown in FIGURES 1 and 2. When the golfer addresses the ball, as shown in FIGURE 1, the distance between points 208 and 335 will be a predetermined value. As the golfer starts the backswing, club 24 and shaft 286 will be rotated together with roller 316 cooperating with slot 318 for controllably varying the distance between club holder 320 and housing 76. At a point in the backswing, designated at 214 in FIGURE 1, roller 316 will begin substantial upward movement along cam slot 318 thereby advancing club holder 320 toward the individual creating a trace 120 substantially identical with that produced by swing guide mechanism 20.

While the backswing is beginning, roller 332 is moved through cam slot 330 as shown in FIGURE 14 and engages diverting cam 336 at a point shown as 339 in FIGURE 2. The engagement of roller 332 with diverting cam 336 constrains point 208 to a predetermined path during the backswing. When the top of the backswing is reached, designated as point 341 in FIGURE 2, roller 332 passes over connection 334 and moves along the inner trace of cam slot 330 rapidly moving bracket 308, plate 322 and club holder 320 toward the axis of shaft 286 thereby shortening the distance between the locus of point 208 and axis 68. The shortening of this distance produces the closed loop shown in FIGURE 2 thereby more accurately simulating the characteristics of a good golf swing.

Swing guide mechanism of FIGURES 16 to 22

Referring now to FIGURES 16 and 17, another form of swing guide mechanism is shown generally at 340 including a cylindrical housing 342 secured to mounting plate 60 of support 16 by a substantially U-shaped spring 344 and suitable fasteners 346 and connected to housing 342 by an adaptor 348 affixed to housing 342 and a plurality of fasteners 350 connecting spring 344 to adaptor 348. A shaft 352 is journaled by a pair of bearings 354 inside housing 342 for rotational movement in response to the swing of golf club 24.

Mounted on the front end of housing 342 is a cam means shown generally at 356 having a follow-through cam segment 358 fixedly secured thereto by a plurality of fasteners 359 and an adjustably mounted cam segment 360 froming a downswing cam track 362 as shown best in FIGURE 20. Cam segment 360 forms a pair of slots 364 communicating with one edge, with a pair of releasable fasteners shown generally at 366 adjustably securing cam segment 360 to cam plate 356. Cam plate 356 also includes a backswing cam segment 368 pivotally mounted on cam segment 360 by a first link 370 and pin 372 and a second link 374 forming an elongate slot 376 slidably receiving a pin 378 integral with cam segment 368. A tension spring 380 biases cam segment 368 toward cam segment 360 such that cam plate 356 operates in much the same manner as cam slot 330 of swing guide mechanism 278.

Swing guide mechanism 340 includes a motion transmitting means shown generally at 382 connecting a golf club holder shown generally at 383 to shaft 352 and cam means 356 for moving golf club 24 arcuately about the axis of shaft 352 and also providing for radial movement thereof in response to cam means 356. Motion transmitting means 382 includes a plate 384 affixed to the end of shaft 352 by a hub 385, a pair of side walls 386, 388 extending forwardly of plate 384, and an overhanging ledge 390, 392 forming a track for the reception of guide wheels as will be more fully explained hereinafter. A bottom wall 394 connects side walls 386 and 388 together and forms an opening 396 slidably receiving a pair of parallel rods 398 affixed at one end to a block 400 carrying a roller 402 thereon in engagement with the camming surfaces of cam means 356.

Rods 398 are fixedly secured to a cart shown generally at 404 comprised of a block or bracket 406 mounted for movement between side walls 386, 388 by a plurality of rotatable wheels 408. A spring 399 surrounds each of rods 398 biasing cart 404 away from bottom wall 394 thereby forcing roller 402 into engagement with cam means 356. Wheels 408 move between ledge 390 and plate 384 in response to the action of roller 402 on the camming surfaces of cam means 356. Since club holder 383 is mounted on the upper end of cart 404 by a hinge shown generally at 410 comprised of a hinge plate 412 affixed to the upper end of cart 404 and a conventional pivotal connection 414, it will be apparent that holder 383 moves in response to cam means 356 and roller 402.

Club holder 383 includes a plate 416 pivotally secured to connection 414 and fixedly carrying a block 418 thereon having a pair of aligned apertures 420 extending therethrough as shown in FIGURES 16 and 18. A pair of rods 422 are slidably mounted in apertures 420 and are interconnected by a bar 424. An adjusting mechanism shown generally at 426 includes a threaded shank 428 journaled through bar 424 by a sleeve 430 and includes a knurled knob 432 for threadably engaging shank 422 in a threaded opening 434 in block 418. It will be apparent that the rotation of knob 432 will act to adjust the space between plate 424 and block 418 for adjusting the angle of golf club 24 operating in a similar manner to the adjusting mechanism of FIGURE 7.

It will be readily apparent that club holder 383 may pivot about the axis of hinge 410. To provide a control for this pivotal movement, a pair of stops shown generally at 436, 438 are formed on the upper and outer surfaces of cart 404 as shown best in FIGURE 16. Each of stops 436, 438 includes an enlarged head 440, 442 adapted to engage block 418 when club holder 383 is pivoted upwardly or downwardly an extent greater than deemed desirable.

Another important feature of swing guide mechanism 340 resides in the provision of an overswing reminder mechanism shown generally at 520 comprised of a lever 522 pivotally mounted by a pin 524 to the back of cam means 356 as shown best in FIGURE 20. Lever 522 carries an enlarged head 526 extending toward the golfer's position over the edge of cam means 356 and cam plate 360. A spring 528 biases lever 522 in a clockwise direction against the upper edge of plate 356. In the event that the player takes too great a backswing, roller 402 engages head 526 and pivots it in a counterclockwise direction against the face of spring 528. Thus mechanism 520 acts to remind the student that the backswing describes too great an arc.

Referring now to FIGURES 16 and 19, a hub 444 and a dielectric disk 446 are mounted for rotation with shaft 352 by an enlargement 448 on the end of stationary bearing 354 and a removable nut 450 received on the threaded end 452 of shaft 352. A braking mechanism shown generally at 454 cooperates between stationary housing 342 and rotating hub 444 compelling the student golfer to exert increased forces during the power segment of the stroke.

Braking mechanism 454 includes a support 456 secured to housing 342 and extending rearwardly thereof to juxtapose hub 444. A threaded sleeve 458 is mounted on support 456 and receives a threaded screw 460 at the outer end thereof and a ball 462 at the inner end. A spring (not shown) is preferably disposed inside sleeve 458 between screw 460 and ball 462 for biasing ball 462 into contact with a restraining strip 464 as more fully explained hereinafter. Ball 462 is retained in sleeve 458 by making the adjacent end of sleeve 458 of slightly less diameter than the remaining internal diameter of sleeve 458. Mounted on hub 444 in alignment with braking mechanism 454 is a concavo-convex metal strip 464. As shown in FIGURES 16 and 19, ball 462 contacts the apex of strip 464 when golf club 24 is at the lowermost portion of the swing. When the golfer starts the backswing, hub 444 will rotate in the direction shown by the arrow in FIGURE 19 such that ball 462 moves off strip 464. As the downswing commences, hub 444 rotates in a direction opposite to that shown by the arrow in FIGURE 19 with ball 462 engaging strip 464 near the bottom of the downswing. As ball 462 engages strip 464, the spring inside sleeve 458 is compressed thereby increasing the forces required to rotate hub 444 and shaft 352. Accordingly, the student must exert additional forces to overcome this retardation of shaft 352.

Referring now to FIGURES 16, 21 and 22, an electrical circuit is shown generally at 466 comprised of a first branch shown generally at 468 arranged to activate a bell 470 three times during the stroke. The golfer is instructed to pace his swing so that the three rings are substantially equally spaced apart. Circuit 466 also includes a second branch shown generally at 472 operatively connected to platform 14 of FIGURES 1 and 3 for sounding a buzzer 474 thereby indicating that the individual's weight is on the wrong foot. Circuit 466 is energized by a transformer shown generally at 476 to provide electrical energy to bell 470 and buzzer 474 upon the completion of an electrical path of first branch 468 or second branch 472, although it is to be understood that suitable batteries or other conventional electrical power may be used.

Dielectric disk 446 carries a pair of circumferentially spaced electrical contacts 478, 480 each of which is connected by a lead wire 482, 484 leading to a grounded electrical connection 486 through hub 444. A brush contact 488 is positioned on housing 342 by a bracket 490 (FIGURE 16) for engaging contacts 478, 480 upon the rotation of disk 446 which is, of course, controlled by the movement of golf club 24 by a student. Brush contact 488 is connected by an electrical wire 492 to bell 470 which is in turn connected by a wire 494 to transformer 476.

The schematic showing of FIGURE 22 illustrates the configuration of electrical circuit 466 when the student is in the ball-addressing position. During the backswing, disk 446 will rotate in a counterclockwise direction such that contact 478 first engages brush contact 488 thereby actuating bell 470. As the backswing increases, contact 478 will disengage brush 488 followed by contact 480 engaging brush 488 thereby ringing bell 470 for the second time. During the downswing and follow-through, disk 446 will be rotating in a clockwise direction such that contacts 478, 488 come into juxtaposition during the follow-through thereby actuating bell 470 for a third time. The golf instructor counsels the student to attempt to swing the golf club a substantially even rate such that the three soundings of bell 470 are substantially equally spaced thereby producing a smooth evenly controlled swing.

Second branch 472 of circuit 466 includes a buzzer 474 interconnected between a brush contact 510 and limit switch 36, 38 by conventional wires 512, 514. An arcuate contact 516 is affixed to disk 446 adjacent the periphery thereof for engagement with brush contact 510 to complete the electrical path of branch 472 when either of switches 38, 38 are closed. A wire 518 connects contact 516 to ground 486 to provide for the completed path.

During the backswing hub 446 rotates counterclockwise to engage contacts 510, 516. In the event that the player has failed to shift his weight from the left leg, contacts 36, 38 on platform 16 will be closed thereby completing first branch 472 and sounding buzzer 474. The player is therefore informed of the failure to shift his weight on the backswing. During the downswing, the player should shift the weight to the left leg so that contacts 36, 38 engage to sound buzzer 474 for a short time. Accordingly, by the sound of the buzzer on the downswing, the player is advised of correct weight shifting.

Transformer 476 includes a pair of alternating current carrying line 496 interconnected by a conventional coil 498 juxtaposed to an iron core 500. A second wire 502 carries a coil 504 adjacent core 500. One end of wire 502 is grounded as at 506 with the other end being connected to lead wire 949 as at 508. It will be readily apparent that alternating current delivered through wires 496 will be stepped down in voltage by the action of coils 498, 504 and core 500. It will similarly be seen that the juxtaposition of brush contact 488 with either of movable contacts 478, 480 will complete an electrical circuit thereby energizing bell 470.

It is now seen that there is herein provided an improved golfer's training device which accomplishes all of the objects of the instant invention and others, including many advantages of great practical utility and commercial importance.

Since many embodiments may be made of the instant inventive concept, and since many modifications may be made of the embodiments hereinbefore shown and described, it is to be understood that the foregoing is to be interpreted merely as illustrative and not in a limiting sense.

I claim:

1. A training device for teaching the correct swing of a golf club, including a full backswing, comprising:
   an upstanding support;
   a golf club swing guide mechanism;
   means resiliently mounting the swing guide mechanism on the support for accommodating minor variations in the individual's swing; and
   a golf club holder including means for grasping a golf club shaft;
   the swing guide mechanism including
       means mounting the shaft grasping means for arcuate movement about and at a varying distance from a substantially horizontal axis, the distance increasing at a given rate during rearward backswing movement of the grasping means and decreasing at a greater rate during forward downswing movement of the grasping means so that a loop at the top of the golfer's backswing may be formed.

2. The golfer's training device of claim 1 wherein the mounting means includes:
   a shaft journaled for rotation in the guide mechanism;
   a rigid bracket mounted on the shaft for rotation therewith, the shaft grasping means being mounted for movement with the bracket;
   means mounting the bracket for movement substantially radially of the shaft; and
   means for moving the bracket away from the shaft during the backswing of the shaft grasping means and toward the shaft during the downswing for creating the loop at the top of the golfer's backswing.

3. The golfer's training device of claim 1 further including means, on the swing guide mechanism, for contacting the mounting means at the top of the backswing and resisting further backswing movement of the shaft grasping means.

4. The golfer's training device of claim 1 wherein the swing guide mechanism includes a housing including a slot defining a portion of an ellipse lying in a plane intersecting the axis, the mounting means includes a shaft journaled on the guide mechanism for rotation about its longitudinal axis, the mounting means includes:
   an arm, mounted on the shaft for to and fro movement in a direction parallel to the axis of the shaft and for rotational movement with the shaft, the shaft grasping means being mounted for movement with the arm; and
   a roller, mounted on the arm, in engagement with the slot for moving the arm to and fro parallel to the axis.

5. A training device for teaching the correct swing of a golf club, including a full backswing, comprising:
   an upstanding support;
   a swing guide mechanism mounted on the support; and
   a golf club holder including means for grasping a golf club shaft;
   the swing guide mechanism including
       means mounting the shaft grasping means for arcuate movement about a substantially horizontal axis comprising a shaft journaled for rotation in the guide mechanism; and a bracket radially movable on the shaft and rotatable therewith, the shaft grasping means being mounted for both radial and rotatable movement with the bracket; and means for moving the shaft grasping means away from the axis at a given rate during the rearward backswing and toward the axis at a greater rate during the forward downswing for creating a loop at the top of the golfer's backswing, the moving means comprising a stationary cam track defining the downswing path, a movable cam track defining the backswing path; and a cam follower carried by the bracket for engaging the movable cam track during the backswing and engaging the stationary cam track during the downswing.

6. The golfer's training device of claim 5 wherein:
   the stationary cam track comprises a plate, surrounding the shaft, including an arcuate cam slot lying in a plane substantially perpendicular to the shaft, the cam slot forming a bulbous enlargement corresponding to the top of the backswing;
   the movable cam track comprises a cam diverter, pivotally mounted on the plate in the enlargement below the upper end thereof, normally biased toward the shaft; and
   the cam follower being positioned for engagement with the cam slot for movement between the outer trace of the cam slot and the diverter during the backswing and between the inner trace of the cam slot and the cam diverter during the downswing.

7. The golfer's training device of claim 5 wherein:
   the stationary cam track comprises a generally circular cam plate forming a downswing cam track and a follow-through cam track;
   the movable cam track comprises a backswing cam segment providing a backswing cam track and movably mounted on the swing guide mechanism adjacent the downswing cam track for movement from a first position in which the cam segment is juxtaposed to the cam plate to a second position in which the cam segment is spaced from the cam plate;
   the movable cam track further comprising means biasing the cam segment toward the cam plate; and the cam follower being positioned for engagement with the cam plate for movement along the cam segment during the backswing, between the cam plate and cam segment during the downswing and along the cam plate during the follow-through.

8. The golfer's training device of claim 7 further including means, on the swing guide mechanism, for contacting the cam follower at the top of the backswing and resisting further backswing movement of the shaft.

9. The golfer's training device of claim 7 wherein the cam plate includes a stationary plate, a downswing cam segment forming the downswing cam track and means mounting the downswing cam segment on the stationary plate for adjustable movement toward and away from the shaft, the backswing cam segment being mounted on the downswing cam segment.

10. The golfer's training device of claim 9 including means biasing the cam follower into engagement with the cam surfaces.

References Cited

UNITED STATES PATENTS

| | | | |
|---|---|---|---|
| 2,472,065 | 6/1949 | Cottingham | 273—191 |
| 2,737,432 | 3/1956 | Jenks | 273—191 X |
| 3,352,559 | 11/1967 | Larsen | 273—187 |

ANTON O. OECHSLE, *Primary Examiner.*

C. J. MARLO, *Assistant Examiner.*

U.S. Cl. X.R.

273—187, 190, 191; 35—29